United States Patent
Lewallen (10) Patent No.: US 6,748,591 B1
(45) Date of Patent: Jun. 8, 2004

(54) METHOD, SYSTEM, PROGRAM, AND DATA STRUCTURES FOR LOADING PROGRAMS INTO A RUNTIME ENVIRONMENT

(75) Inventor: Stephen Richard Lewallen, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 525 days.

(21) Appl. No.: 09/661,609

(22) Filed: Sep. 14, 2000

(51) Int. Cl.⁷ .................................................. G06F 9/44
(52) U.S. Cl. ........................ 717/170; 717/120; 717/166
(58) Field of Search ................................. 717/124–175; 709/331, 332; 707/203

(56) References Cited

U.S. PATENT DOCUMENTS

| | | | | |
|---|---|---|---|---|
| 5,634,114 A | * | 5/1997 | Shipley | 717/170 |
| 5,790,865 A | * | 8/1998 | Smaalders et al. | 717/158 |
| 5,805,899 A | * | 9/1998 | Evans et al. | 717/170 |
| 5,974,428 A | * | 10/1999 | Gerard et al. | 707/203 |
| 6,016,392 A | | 1/2000 | Jordan | 709/328 |
| 6,199,196 B1 | * | 3/2001 | Madany et al. | 717/165 |
| 6,381,742 B2 | * | 4/2002 | Forbes et al. | 717/176 |
| 6,442,753 B1 | * | 8/2002 | Gerard et al. | 717/170 |

OTHER PUBLICATIONS

Levine, John R.; "Linkers and Loaders"; Morgan Kaufmann Publishers; Academic Press; Jan. 15, 2000; pp. 241–244.*

Microsoft Corporation, "The Component Object Model Specification", Version 0.9, Oct. 24, 1995.

J. Robie, "What is the Document Object Model?", Texcel Research, REC–DOM–Level–1–19981001, pp. 1–5, [retrieved on Feb. 7, 2001]. Retrieved from the Internet <URL: http://www.w3.org/TR/REC–DOM–Level–1/introduction.html>.

C. Verbowski, "Integrating Java and COM", Microsoft, Corporation, Jan. 1999, pp. 1–10.

Microsoft Corp., "Document Object Model Overview", copyright 2000, pp. 1–10, [retrieved on Feb. 6, 2001]. Retrieved from the Internet <URL: http://www.microsoft.com>.

IBM Corp., "SOMobjects", referring to The System Object Model (SOM) and the Component Object Model (COM), Jul. 7, 1994, pp. 1–5 [originally retrieved on Feb. 6, 2000, this copy retrieved on Sep. 14, 2001]. Retrieved from the Internet <URL: http://www–4.ibm.com/software/ad/som/library/somvscom.html>.

"QueryInterface", pp. 1–5, [retrieved on May 1, 2001]. Retrieved from the internet.

"Interface Attributes", pp. 1–2, [retrieved on May 1, 2001]. Retrieved from the Internet.

C. Verbowski, "Using COM Objects from Java", Microsoft, Corporation, Feb. 1999, pp. 1–34.

(List continued on next page.)

*Primary Examiner*—Kakali Chaki
*Assistant Examiner*—William H. Wood
(74) *Attorney, Agent, or Firm*—David W. Victor; Konrad, Raynes & Victor LLP (57) ABSTRACT

Provided is a method, system, program, and data structures for installing components in a computer runtime environment. A kit file is retrieved including information on program components to load into memory. The retrieved kit file information is used to retrieve the program components for the kit file. The retrieved program components for the kit file are loaded into the runtime environment. A determination is made as to whether there are dependency kit files associated with the retrieved kit file. Program components for each determined dependency kit file are maintained in the runtime environment, wherein classes and interfaces are resolved using the program components loaded into the runtime environment.

50 Claims, 8 Drawing Sheets

OTHER PUBLICATIONS

Microsoft Corp., "The Component Object Model: A Technical Overview", copyright 2000, pp. 1–20, [retrieved on Feb. 6, 2001]. Retrieved from the Internet <URL: http://msdn.microsoft.com/library/techart/msdn_comppr.htm.

I. Kushnirskiy, "Java–to–XPCOM Bridge", Sep. 18, 2000, pp. 1–2, [retrieved on Feb. 7, 2001]. Retrieved from the Internet <URL: http://www.mozilla.org/projects/blackwood/connect/>.

* cited by examiner

```
<!ELEMENT kit (program, detail, dependencies)>
<!ELEMENT program>
<!ELEMENT program classname>
<!ELEMENT detail>
<!ATTLIST detail version>
<!ATTLIST kitloader (system|program)>
<!ATTLIST install (yes|no)>
<!ATTLIST classpath>
<!ATTLIST binder>
<!ATTLIST map>
<!ATTLIST lib>
<!ELEMENT dependencies (kiturl)>
<!ATTLIST kiturl name>
<!ATTLIST kiturl version>
<!ATTLIST kiturl url>
```

METHOD, SYSTEM, PROGRAM, AND DATA STRUCTURES FOR LOADING PROGRAMS INTO A RUNTIME ENVIRONMENT

BACKGROUND OF THE INVENTION

1. Field of the Invention

Preferred embodiments provide a method, system, program, and data structures for loading programs, including program components and dependencies, into a runtime environment.

2. Description of the Related Art

A program interpreter is a module that decodes and executes every statement in some body of code. For instance, in the Java programming environment, the Java interpreter decodes and executes bytecodes for the Java Virtual Machine.** The Java Platform converts Java source code (.Java files) to bytecodes (.class files), which are machine independent representations of a Java class. Thus, the same bytecodes would be created for all operating system platforms. The bytecodes are then inputted to a Java Virtual Machine program that converts the byte codes to the object code in the native machine language of the operating system on which the Java Virtual Machine is installed.

When upgrading to a new version of a Java Virtual Machine, which is distributed in a Java Development Kit (JDK), that also includes a Java Interpreter and other application tools and interfaces for Java programs, the new class and methods of the new Java Virtual Machine and JDK are loaded into memory.** This update may overwrite older versions of certain methods and classes used in the previous version of the JDK. Thus, there is an issue as to whether a Java program written for an older version of the JDK is compatible with the updated JDK, which may modify certain methods and classes used by the program. For instance, JDK 1.1.x is upwards source-compatible with 1.0.x, except for certain incompatibilities. This means that source files written to use the language features and APIs defined for 1.0.x can be compiled in 1.1.x and will run in 1.1.x. Downward source compatibility is not supported. If source files use new language features or APIs in JDK 1.1.x, they will not be usable with an earlier version of Java, e.g., JDK 1.0x. Further, there are many instances in which there is upward incompatibility, such as when APIs and methods have changed.

** Java and JDBC are trademarks of Sun Microsystems, Inc.; Microsoft and Windows are registered trademarks of Microsoft Corporation; OS/2 is a registered trademark of International Business Machines Corporation; Netscape is a registered trademark and Netscape Communicator, Netscape Navigator, Mozilla are trademarks of Netscape Communications Corporation; QuickTime is a trademark of Apple Computer, Inc.

Still further, there is upward incompatibility if a program includes a fix for a bug in an earlier version 1.0.x and the later version 1.1.x corrects the bug. In such case, the fix in the program will not work because the bug is no longer present in the newer version 1.1.x.

Thus, there is a need in the art to allow programs written for one version of a JDK kit, or language translator, to be compatible with later and previous versions of the same translator.

SUMMARY OF THE PREFERRED EMBODIMENTS

To overcome the limitations in the prior art described above, preferred embodiments disclose a method, system, program, and data structures for installing components in a computer runtime environment. A kit file is retrieved including information on program components to load into memory. The retrieved kit file information is used to retrieve the program components for the kit file to load into the runtime environment. A determination is made as to whether there are dependency kit files associated with the retrieved kit file. Program components for each determined dependency kit file are maintained in the runtime environment, wherein classes and interfaces are resolved using the program components loaded into the runtime environment.

In further embodiments, the retrieved program components for the retrieved kit file and the program components for the determined dependency kit files are stored in the file directory.

In still further embodiments, a kit object is associated with each kit file and the program components of the kit file loaded in the runtime environment. The kit objects are linked such that the order in which the kit objects are linked indicates an order in which the program components for the associated kit files are considered to resolve a program call. In this way, the program components associated with one kit object at a relatively higher order in the linking of the kit objects are considered before the program components associated with kit objects at a relatively later order in the linking.

The preferred embodiments provide a system for loading all the program components needed to support a kit file for a program, including any dependency kit files and program components needed for the runtime environment. Preferred embodiments provide a technique for loading program components associated with kit files into memory in a manner that allows different versions of a same kit file to be considered in a different order for resolving classes and interfaces called from different programs executing in the runtime environment. Preferred embodiments provide a technique to store the program components of kit files in an installation directory for later use when installing the program components into the runtime environment for a particular program.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Figure 1:
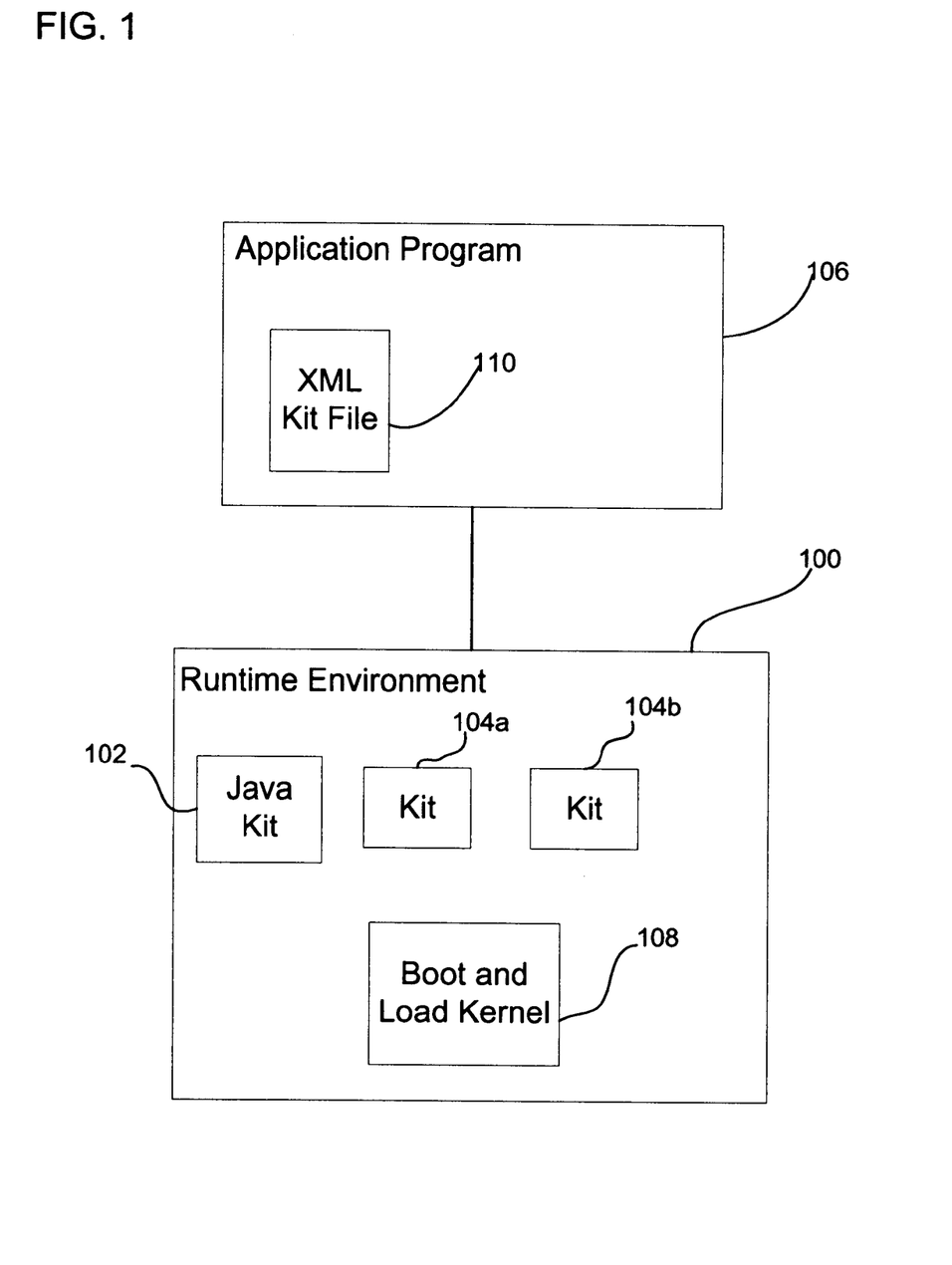
FIG. 1 illustrates components of a runtime environment in accordance with preferred embodiments of the present invention.

FIG. 1 illustrates elements of the runtime environment 100, including a Java kit 102 including the classes to implement the Java Runtime environment, and other kits 104a, b that implement interfaces and other classes upon which an application program, 106, such as a Java program, depends in order to execute. A boot and load kernel 108 loads the kits 102 and 104a, b into the runtime environment 100 in order to translate the statements in the application program 106 into interfaces that can be executed by the user interface program or the Java Virtual Machine. The application program 106 may include Java methods and calls. In this way, the kits define the behavior of the runtime environment 100 by providing the classes and methods the runtime environment 100 supports.

The boot and load kernel 108 loads kits into memory to allow one or more application programs 106 to run. For each application program 106 executing in the runtime environment 100, the boot and load kernel 108 would determine the kits upon which the application program 106 depends and load those kits 102, 104a, b into memory. In preferred embodiments, the boot and load kernel 108 determines the kits to load for an application program 106 from an XML kit file 110 inside the application program 106 that includes information on the components and kits upon which that application program 106 depends. The boot and load kernel 108 must be able to parse an XML file, load and permanently install binary libraries, including downloading Java JAR files, and determine the program home directory.

Figure 2:
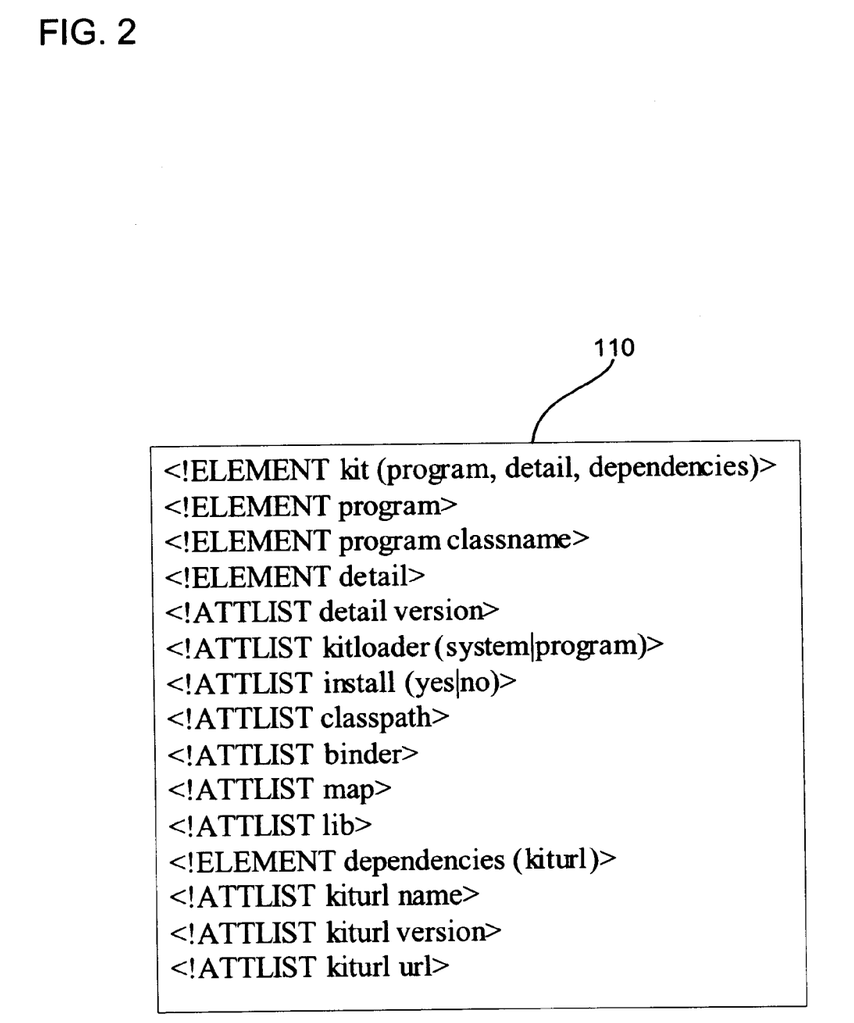
FIG. 2 illustrates an example of an Extended Markup Language (XML) kit file in accordance with preferred embodiments of the present invention.

FIG. 2 illustrates certain elements and attributes that may be included in the XML kit file 110. The "kit" element is the root element and has three separate child elements—program, detail, and dependencies. The "program" element includes a "classname" attribute that indicates the fully qualified classname of the program associated with the kit. The classname is used when launching the application program 106 as an embedded program 106. If the kit is a library source, then the classname may be empty, which indicates that there is no program classname.

The "detail" element includes a "version" attribute indicating the version of the kit, e.g., version 1.1.6. The "kitloader" attribute indicates whether the kit should be located in a program or system chain of kitloaders, as discussed below. If the kit program components contain static information shared between multiple executing programs, then the kit is placed in the system chain. If the kit includes classes and interfaces used only by a single application program, then it is a program kit. The "install" attribute indicates whether to install the kit components and the "classpath" attribute indicates the path for the Java archive (JAR) file for the kit including the methods and classes that implement the kit in the runtime environment 100. The "binder" attribute is the URL of the binder file that includes bindings. Binding is the process by which a function written in a language other than the Java programming language and implementing a native method is integrated into the Java virtual machine in order to be executable. The "map" attribute is the URL of the native method mapping file for the kit folder and the "library" (lib) attribute is the URL of the native shared library for the kit folder.

The third element of the XML kit file 110 is "dependencies". The "dependencies" attribute indicates the kits from which the application program 106 depends in order to execute, and the order of the dependencies indicating which kits are checked first to resolve classes and interfaces. The "name" attribute is the name of the kit, the "version" attribute is the version of the kit, and the "URL" attribute is the Universal Resource Locator (URL) of the kit. In this way the kits upon which the program 106 depends may be located at remote or local URLs. There may be multiple sets of kit attributes, i.e., name, version and URL, for each kit upon which the application program 106 depends in order to execute.

The boot and load kernel 108 would process the XML kit file 110 when the application program 106 is initially loaded. In preferred embodiments, the boot and load kernel 108 instantiates a kitloader for every kit file whose components are loaded into memory. The kitloader is a class that loads the JAR file and manages all aspects of a kit, including classpath, the binder file, native library, and native method map.

Figure 3A:
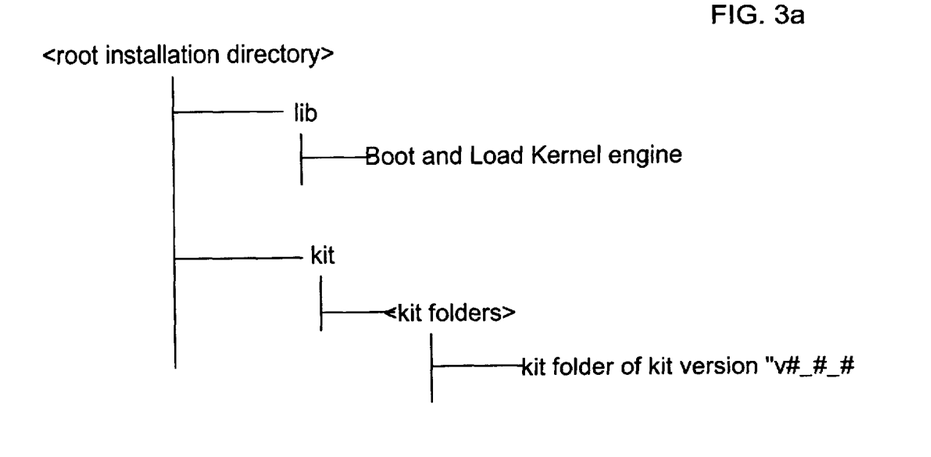
FIGS. 3a, b illustrate an installation directory for kit components in accordance with preferred embodiments of the present invention.
Figure 3B:
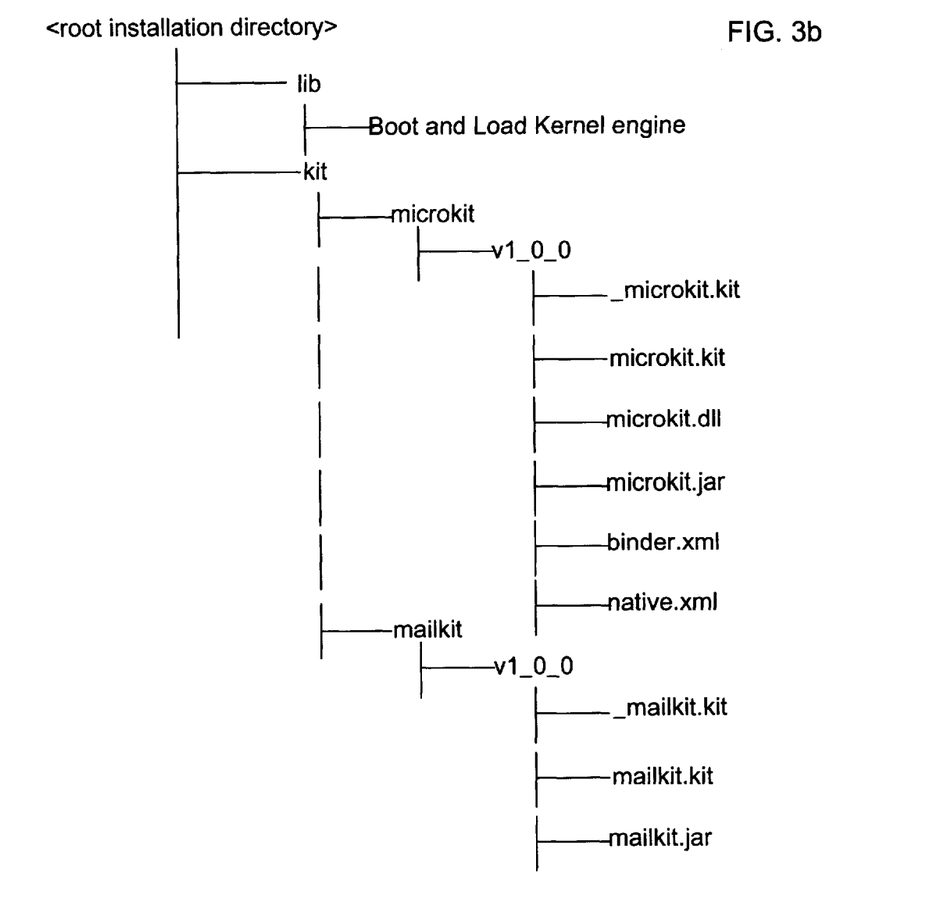

In preferred embodiments, all the components of the installed kits are maintained in an installation directory. FIG. 3a illustrates a structure of the installation directory. The "lib" directory under the root of the installation directory includes the native shared libraries for the general runtime environment 100, including the boot and load kernel engine 108. A kit subdirectory includes subdirectories for each version of a kit. Each kit subdirectory has an individualized name reflective of the purpose of the kit and includes the native libraries, java code (JAR file), native method mappings, and binder files for the kit. Further, in preferred embodiments two versions of the same kit file, i.e., such as the XML kit file 110 shown in FIG. 2, are maintained in the kit folder. One is the original kit file as downloaded from the URL for the kit file, which may be digitally signed by the author, and the other has the original name prepended with an underscore, referred to as the resolved file. The original file provides a record of where the contents of the kit originated. The resolved kit file is unsigned and modified such that the URLs in the resolved kit file point to the location in the installation directory where the referenced program components are stored. FIG. 3b provides an example of two installed kits, microkit and mailkit, and their installed components.

Figure 4:
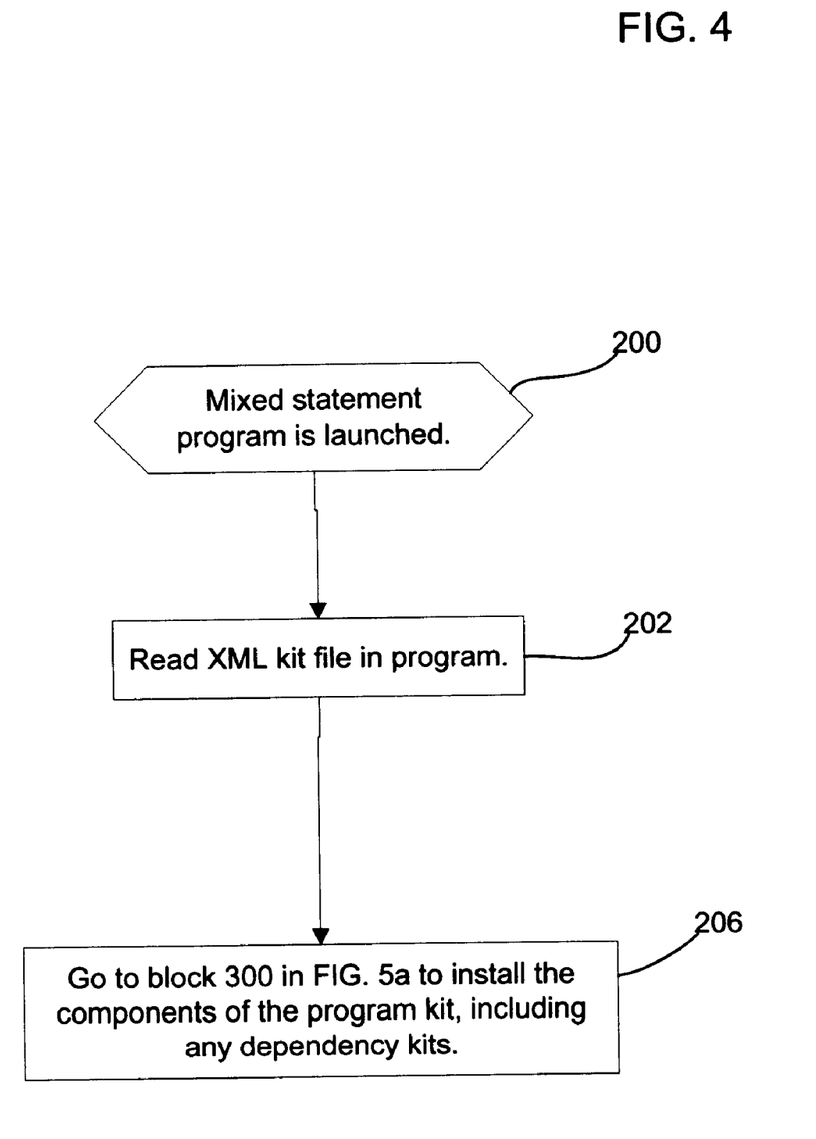
FIGS. 4, 5a, 5b, 6, illustrate logic implemented in the boot and load kernel to install the components of an XML kit file in accordance with preferred embodiments of the present invention.

FIG. 4 illustrates program logic implemented in the boot and load kernel 108 to load the program components of a kit file for a new application program 106 and any dependencies or other files needed for the program 106 to execute. Control begins at block 200 with the application program initially launched or encountered in an HTML page. In response, the boot and load kernel 108 reads (at block 202) the XML kit file 110 in the application program 106. Control proceeds (at block 206) to call the routine or method to install the kit at block 300 in FIG. 5a.

Figure 5A:
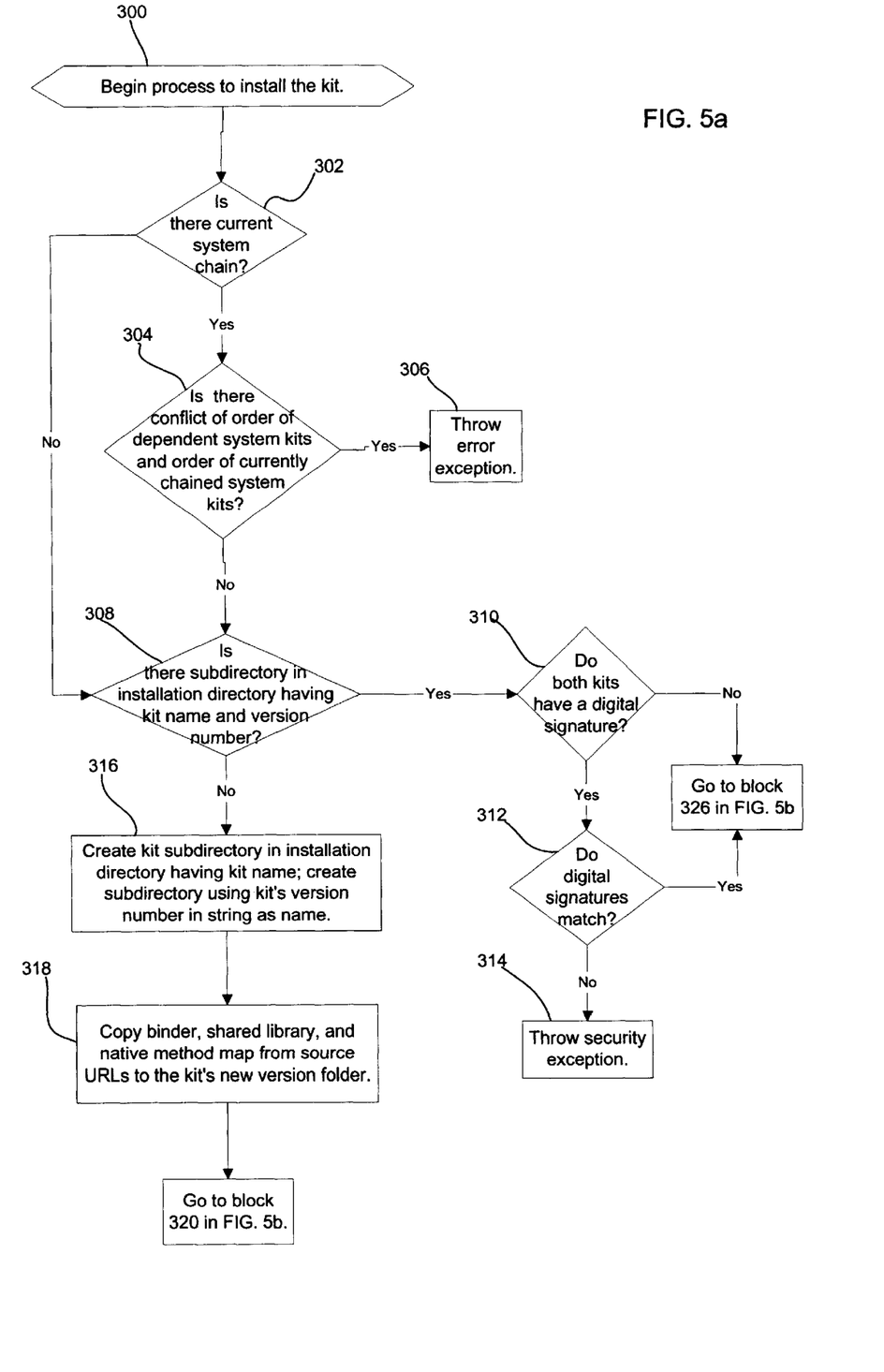
Figure 5B:
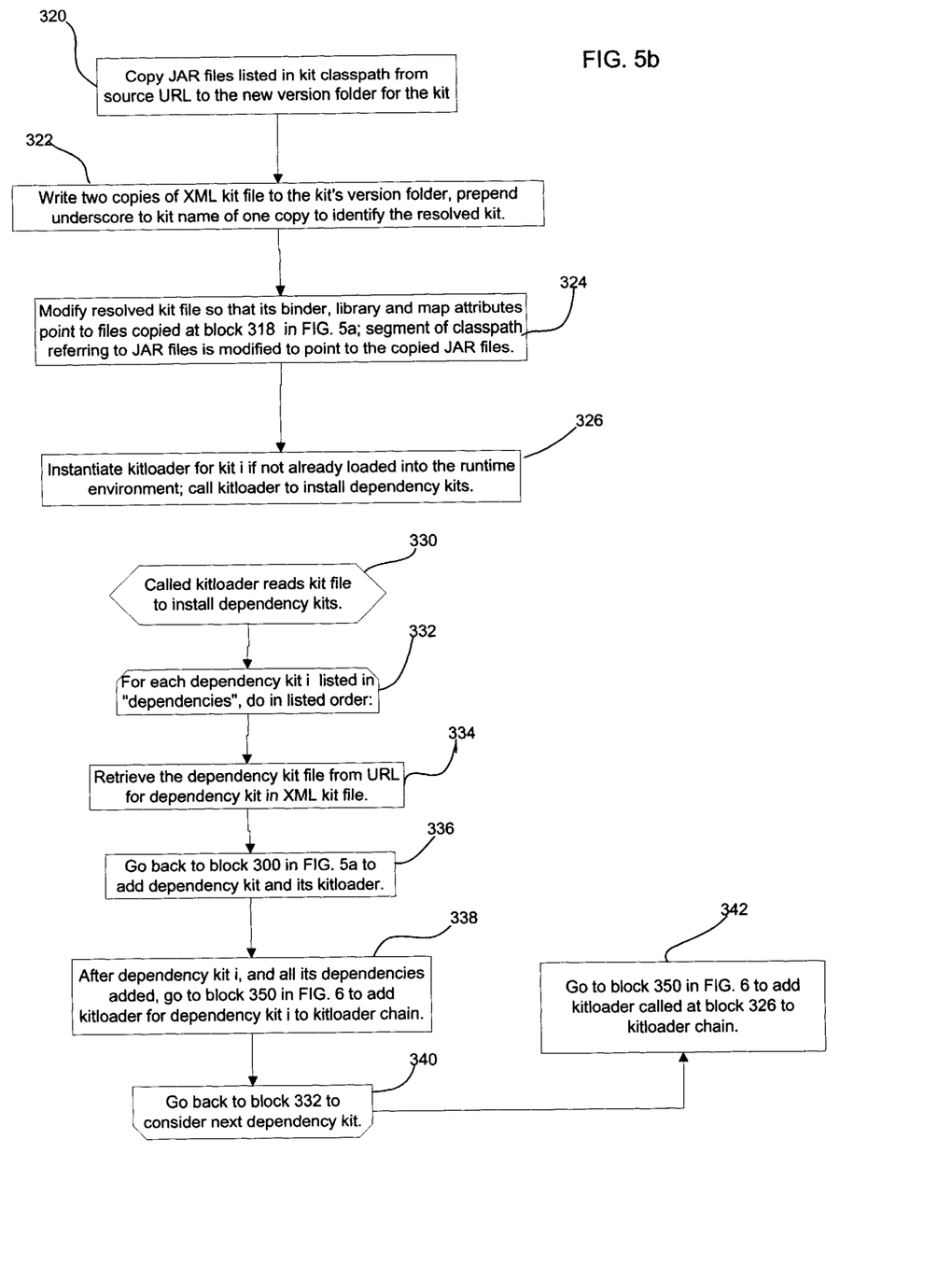

FIGS. 5a, b illustrate logic implemented in the boot and load kernel 108 and the kitloaders to load the program components of the main XML kit file 110. With respect to FIG. 5a, control begins at block 300 where either the boot and load kernel 108 or the kitloader for the XML kit file 110 being loaded or a dependent kit begins the routine to install the program components of a kit file. Only those kit files having the "install" attribute of "yes" for the "detail" element in their XML kit file are installed. Before beginning the installation, the boot and load kernel 108 determines (at block 302) whether there is a current system kitloader chain of system kitloaders chained together. If so, then the boot and load kernel 108 determines (at block 304) whether there is a conflict in the current ordering of the system kitloaders as chained together in the system kitloader chain and the order of the system kitloaders indicated in the "dependences" element. For instance, if the XML kit file "dependencies" element indicates that dependent system kits are in the order of A, D, C and the current system kitloaders are linked in the order of A, C, and D, then there is a conflict in the ordering of the system kits, which provide shared components, in the "dependencies" element of the kit file and the currently chained system kits. As discussed, the "kitloader" attribute of the "detail" element indicates whether a kit is a "system" kit or "program" kit. If there is such a conflict, then an error exception is thrown (at block 306) because the system chain cannot change order for different application programs 106.

If there is no conflict, then the boot and load kernel 108 or some dependent kitloader determines (at block 308) whether there is a subdirectory in the installation directory having the kit name and version number of the kit to install. If so, then the boot and load kernel 108 or kitloader determines (at block 310) whether both the kit file to install, that was provided by the application program 106 or retrieved from a URL, and the original kit file have a digital signature. If so, then the kitloader determines (at block 312) whether the signatures match. If the signatures do not match, then the kitloader throws (at block 314) an error exception. Otherwise, if both the kit to install and the original kit in the installation directory do not have a digital signature or the signatures match, then the already installed kit is used and control proceeds to block 326 in FIG. 5b to instantiate a kitloader for the already installed kit.

If the kit file to load is not already stored in the installation directory, then the boot and load kernel 108 creates a kit subdirectory (at block 316) having the name and version number in the subdirectory as indicated in the "program" element and the "version" attribute of the "detail" element. The boot and load kernel 108 then copies (at block 318) the binder, shared library, and native method map from the source URLs indicated in the XML kit file 110 to the new kit subdirectory. The JAR files listed in the "classpath" attribute of the "detail" element are also copied (at block 320) from the source URL to the new kit subdirectory. The XML kit file is then copied (at block 322) to the new kit subdirectory and a second copy of the XML kit file is made to the new subdirectory having the kit name preceded by an underscore. This copy with the underscore prepended to the XML kit file name is the "resolved" copy of the kit file. The URLs for the binder, library and map attributes in the "resolved" copy of the kit file are modified (at block 324) to point to the copies of such files in the new kit subdirectory. Further, the segment of the "classpath" attribute including JAR files copied to the new kit subdirectory is modified to point to the JAR file location in the new kit subdirectory. In this way, the resolved kit file includes pointers to components maintained in the kit subdirectory.

After the XML kit file 110 and all its components are installed in the installation directory, the boot and load kernel 108 instantiates (at block 326) a kitloader for the kit if a kitloader for the kit is not already loaded in the runtime environment. This kitloader is created by either the boot and load kernel 108, if the dependencies of the program kit are being installed, or one of the dependency kitloaders if dependency kits for a dependency kit are being installed. This instantiated kitloader or preexisting kitloader (from block 310 or 312 in FIG. 5a) then proceeds to block 326 to load into the runtime environment 100 a kitloader for the kit, if one is not already loaded. Control then proceeds to block 330 to begin a loop at blocks 332 to 340 to load all dependent kits identified in the "dependencies" element of the XML kit file for the kitloader instantiated or already loaded in the runtime environment 100 at block 326. For each dependency kit, control proceeds (at block 334) to retrieve the dependency XML kit file from the URL indicated in the "kiturl" attribute of the "dependencies" element. The dependency XML kit file would include the same file format and elements and attributes as the XML kit file 110 shown in FIG. 2. This retrieved dependency XML kit file would then be used as the XML kit file 110 included in the application program 106 to load the dependency kit as the kit for the application program 106. Control then returns (at block 336) to block 300 in FIG. 5a to load the program components of the dependency kit file i and any dependency kits listed in the "dependencies" element of the dependency kit file i. The kitloader instantiated at block 326 would execute the logic at blocks 330–342 to install any dependency kits listed in the XML kit file for the kitloader. Note that blocks 300–340 may be performed recursively for dependency kits within dependency kits. After loading all the components of dependency kit file i, including any dependency kits listed in the XML kit file for kit i, control proceeds to block 342 to add the kitloader for dependency kit i to the kitloader chain by proceeding to block 350 in FIG. 6. After all the dependency kitloaders have been added to the system or program chains, control proceeds (at block 342) to block 350 in FIG. 6 to add the kitloader which initiated the process at block 330 to the kitloader chain.

Figure 6:
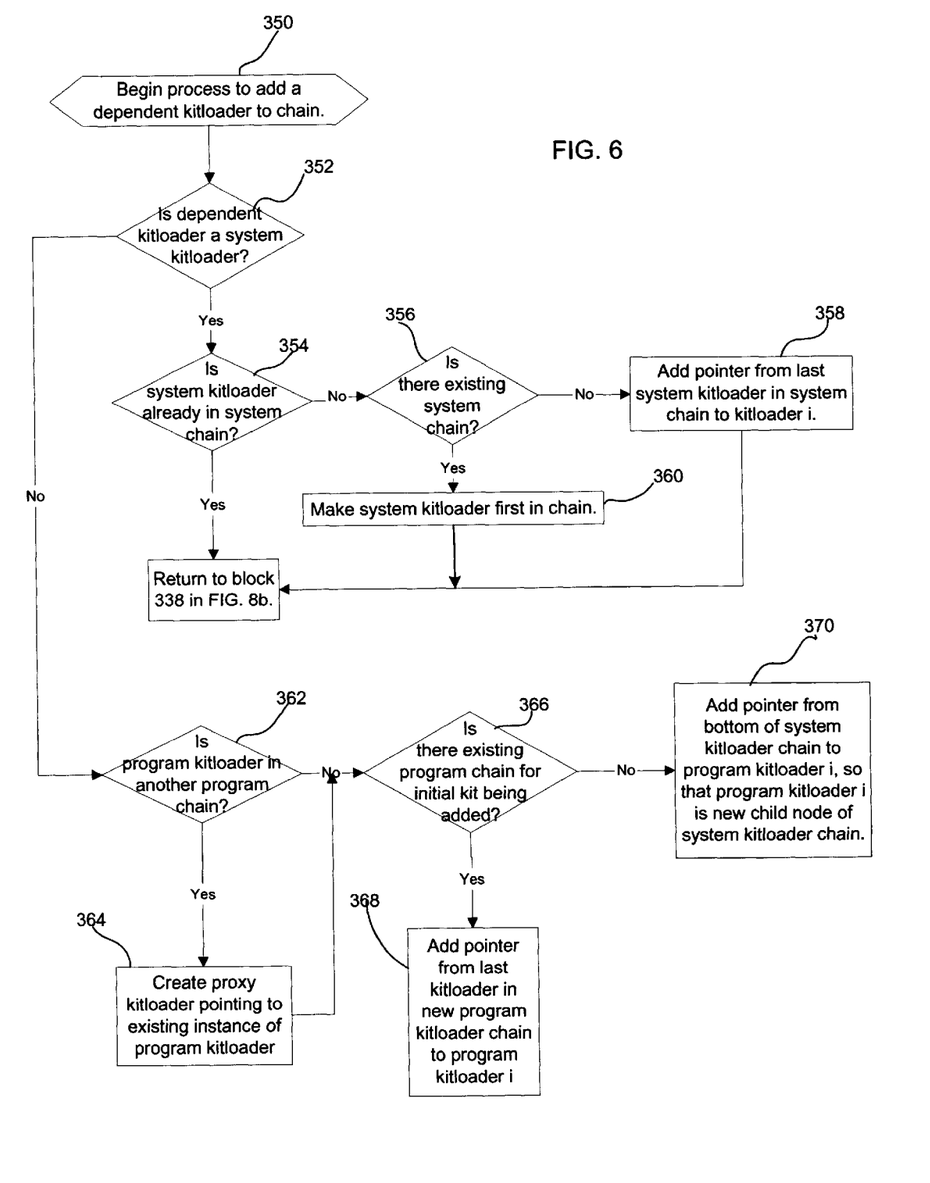

FIG. 6 illustrates logic implemented in the boot and load kernel 108 or a kitloader to add dependent kitloader i to the kitloader chain. As discussed, the main program kitloader is added at the end of the chain at block 340. At block 350 the process to add a kitloader to the kitloader chain begins. If (at block 352) the dependent kitloader is a system kitloader and the system kitloader is already in the system chain (the yes branch from block 354), then the system kitloader does not have to be added to the chain and the current system kitloader in the chain is used, and control returns to block 338 in FIG. 5b. If the system kitloader to add is not already in the system chain and there is an existing system chain (at block 356), then the kitloader adds (at block 358) a pointer from the last system kitloader in the chain to the kitloader for the kit being installed. Otherwise, if there is no existing system chain, then the system kitloader to add becomes the first kitloader in the chain. From blocks 356 or 358, control returns to block 338 in FIG. 5b.

If the dependent kitloader to add to the chain is not a system kitloader (from the no branch of block 352), i.e., is a program kitloader, and the program kitloader already exists (at block 362) in another chain, then a proxy kitloader is created (at block 364) providing a pointer to the preexisting program kitloader in the chain. At block 366, a determination is made if there is an existing program chain for the initial XML kit file considered at block 202 in FIG. 4, i.e., the XML kit file that began this logic stream. If so, then a pointer is added (at block 368) from the last kitloader node in the program chain, extending as a child from the system chain, to the program kitloader to add. Otherwise, if there is no existing program chain for the initial XML kit file, then a pointer is added (at block 370) from the bottom of the system kitloader chain to the program kitloader currently being added so that the program kitloader comprises a new child node to the system kitloader chain.

Figure 7A:
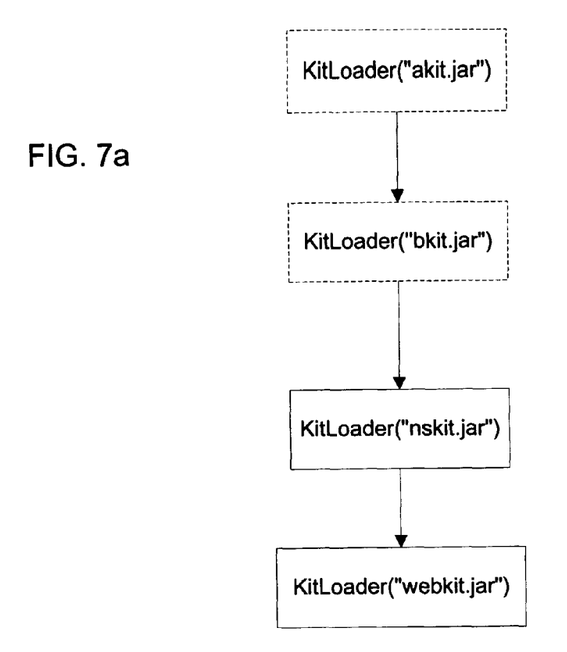
FIGS. 7a and 7b illustrate how kitloaders are chained together in the runtime environment in accordance with preferred embodiments of the present invention.
Figure 7B:
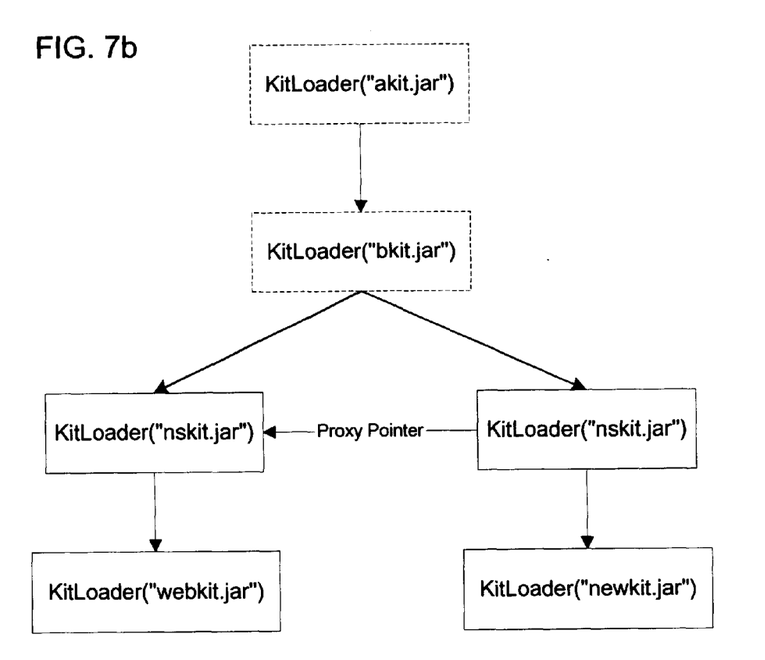

FIGS. 7a, b illustrate examples of how kitloaders may be chained. FIG. 7a, shows a chain for an XML kit file, called "webkit". "Webkit" has three dependency kits, "akit", "bkit", and "nskit". The boxes having dashed lines represent system kitloaders and the solid line box represents a program kitloader. Thus, the system chain for "webkit" comprises "akit" and "bkit" and the program chain comprises "nskit" and the "webkit". FIG. 7b illustrates the addition of a new kit, "newkit", to the runtime environment. The "newkit" program chain, which is a sibling of the "webkit" program chain has at least the same program kit "nskit", and thus has a proxy pointer to the first instance of "nskit".

Chaining the kitloaders allows new kits added to the runtime environment to use preexisting kitloaders already loaded in memory. Further, with the preferred kitloader architecture, different program chains can include kitloaders in different orders. This allows two kitloaders that rely upon different versions of the same program or kit to operate at the same time in the runtime environment 100. For instance, one installed program may rely on an earlier version of a program. In such case, the earlier version of the kit would be listed in the dependency chain before the later version to allow the older version of methods and interfaces to be considered first over those in the newer version. When resolving a class or interface, the first kitloader in the chain resolving that interface would be used. Thus, for the program relying on the older version of the program, the older version would be used to resolve classes and interfaces before the more recent version of the program positioned later in the program chain for that program. A program using the more recent version would have a program chain that would include the kitloader for the newer version of the program before the older version so that classes and interfaces would be resolved first from the newer version. In this way, the runtime environment may allow different versions of a same program to be used by different programs executing in the runtime environment by altering the order of the kitloaders in the program chains for the programs loaded in the runtime environment.

Alternative Embodiments and Conclusions

The following describes some alternative embodiments for accomplishing the present invention.

The preferred embodiments may be implemented as a method, apparatus or information bearing media using standard programming and/or engineering techniques to produce software, firmware, hardware, or any combination thereof. The programs defining the functions of the preferred embodiment can be delivered to a computer via a variety of information bearing media, which include, but are not limited to, computer-readable devices, carriers, or media, such as a magnetic storage media, "floppy disk," CD-ROM, a file server providing access to the programs via a network transmission line, wireless transmission media, signals propagating through space, radio waves, infrared signals, etc. Of course, those skilled in the art will recognize that many modifications may be made to this configuration without departing from the scope of the present invention. Such information bearing media, when carrying computer-readable instructions that direct the functions of the present invention, represent alternative embodiments of the present invention.

The application programs may be executed on any computing device that is capable of executing the JDK and Java Virtual Machine to transform the application code to either the native operating system code used by the computing device or the user interface.

The preferred algorithm described particular steps as occurring in a particular order. However, in further embodiments the order of the steps may be changed and certain steps removed and added without departing from the scope of the invention. Moreover, different steps may be performed to execute the overall operation of the algorithm.

Preferred embodiments described the kit being loaded into memory as a Java JDK kit. However, those skilled in the art will appreciate that the preferred embodiment kit loader technique could apply to different language translators, other than Java translators, when there are multiple versions of the language translator.

Preferred embodiments described the kit file as an XML file. In alternative embodiments, the kit file may be in file formats other than XML.

Preferred embodiments referred to the program elements used to manage the program components of a kit file in the runtime environment as kitloaders. In alternative embodiments, different types of one or more objects may be used to perform the operations of the kitloaders.

In summary, the present invention provides a method, system, program, and data structures for installing components in a computer runtime environment. A kit file is retrieved including information on program components to load into memory. The retrieved kit file information is used to retrieve the program components for the kit file. The retrieved program components for the kit file are loaded into the runtime environment. A determination is made as to whether there are dependency kit files associated with the retrieved kit file. Program components for each determined dependency kit file are maintained in the runtime environment, wherein classes and interfaces are resolved using the program components loaded into the runtime environment.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for installing components in a computer runtime environment, comprising:

retrieving a kit file including information on program components to load into memory;

using the retrieved kit file information to retrieve the program components external to the kit file;

loading the retrieved program components for the kit file into the runtime environment;

determining whether there are dependency kit files associated with the retrieved kit file;

loading program components for each determined dependency kit file in the runtime environment, wherein classes and interfaces called from programs executing in the runtime environment are resolved using the program components loaded into the runtime environment; and maintaining one kit object for each kit file, wherein one kit object is associated with each kit file and program components of the kit file loaded in the runtime environment, wherein the kit objects are used to determine how to resolve calls from the program components.

2. The method of claim 1, further comprising:
storing the retrieved program components for the retrieved kit file in a file directory; and storing program components for the determined dependency kit files in the file directory.

3. The method of claim 2, further comprising:
retrieving file kits for any nested dependency kit files of the determined dependency kit files;
storing the program components of the nested dependency kit files in the file directory; and
loading the program components of the nested dependency kit files in the file directory.

4. The method of claim 2, further comprising:
for each dependency kit file, determining whether the program components for the dependency kit file are stored in the file directory;
retrieving the dependency kit file and the program components thereof from a storage device if the program components for the dependency kit file are not stored in the file directory;
storing the program components of the retrieved dependency kit file in the file directory; and
loading the program components for the retrieved dependency kit files into the runtime environment.

5. The method of claim 1, wherein the kit file comprises an XML document, wherein attributes of the kit file indicate a URL for the program components of the kit file and URLs for the dependency kit files.

6. The method of claim 1, wherein order in which the kit objects are linked indicates an order in which the program components for the associated kit files are considered to resolve a program call, wherein the program components associated with one kit object at a relatively higher order in the linking of the kit objects are considered before the program components associated with kit objects at a relatively later order in the linking.

7. The method of claim 6, wherein the linking of kit objects comprises a first linking of system kit objects whose associated program components are capable of being shared by all programs executing in the runtime environment and a second linking of kit objects associated with program components that are only used by one program in the runtime environment.

8. The method of claim 7, wherein the second linking comprises multiple chains of kit objects, wherein each chain in the second linking is used by only one program executing in the runtime environment.

9. The method of claim 8, wherein a first and second chains in the second linking are capable of including at least two of a same kit objects in a different order, wherein a first program in the runtime environment associated with the first chain and a second program associated with the second chain resolve program calls from the program components associated with kit objects in the first and second chains, respectively, in the order indicated in the first and second chains.

10. The method of claim 9, wherein the first and second chains include kit objects associated with a first and second version of a same kit file program in a different order, wherein the first and second programs executing in the run time environment would resolve program calls from program components for the version of the kit file according to the order of the corresponding kit objects in the first and second chain, respectively.

11. The method of claim 6, wherein kit objects are linked according to an order in which the dependency kit files are listed in the kit file.

12. A method for installing components in a computer runtime environment, comprising:
retrieving a kit file including information on program components to load into memory;
using the retrieved kit file information to retrieve the program components for the kit file;
loading the retrieved program components for the kit file into the runtime environment;
determining whether there are dependency kit files associated with the retrieved kit file;
loading program components for each determined dependency kit file in the runtime environment, wherein classes and interfaces called from programs executing in the runtime environment are resolved using the program components loaded into the runtime environment;
storing the retrieved program components for the retrieved kit file in a file directory; and
storing program components for the determined dependency kit files in the file directory, wherein the file directory includes a separate subdirectory for each kit file to store the program components for the kit file, wherein the name of the subdirectory indicates a name and version of the kit file.

13. A method for installing components in a computer runtime environment, comprising:
retrieving a kit file including information on program components to load into memory;
using the retrieved kit file information to retrieve the program components for the kit file;
loading the retrieved program components for the kit file into the runtime environment;
determining whether there are dependency kit files associated with the retrieved kit file;
loading program components for each determined dependency kit file in the runtime environment, wherein classes and interfaces called from programs executing in the runtime environment are resolved using the program components loaded into the runtime environment;
storing the retrieved program components for the retrieved kit file in a file directory;
storing program components for the determined dependency kit files in the file directory;
storing in the file directory a previously retrieved copy of the kit file;
determining whether the retrieved kit file matches the previously retrieved kit file stored in the file directory;
loading the program components from the file directory into the runtime environment if the retrieved and previously retrieved kit files match; and
throwing an exception if the retrieved and stored kit files do not match.

14. A system for installing components in a computer runtime environment executing at least one program calling classes and interfaces, comprising:
a memory;
means for retrieving a kit file including information on program components to load into the memory;
means for using the retrieved kit file information to retrieve the program components external to the kit file;
means for loading the retrieved program components for the kit file into the runtime environment;

means for determining whether there are dependency kit files associated with the retrieved kit file;

means for loading program components for each determined dependency kit file in the runtime environment, wherein the classes and interfaces are resolved using the program components loaded into the runtime environment; and means for maintaining one kit object for each kit file, wherein one kit object is associated with each kit file and program components of the kit file loaded in the runtime environment, wherein the kit objects are used to determine how to resolve calls from the program components.

15. The system of claim 14, further comprising:

means for storing the retrieved program components for the retrieved kit file in a file directory; and means for storing program components for the determined dependency kit files in the file directory.

16. The system of claim 15, wherein the file directory includes a separate subdirectory for each kit file to store the program components for the kit file, wherein the name of the subdirectory indicates a name and version of the kit file.

17. The system of claim 15, further comprising:

means for determining, for each dependency kit file, whether the program components for the dependency kit file are stored in the file directory;

means for retrieving the dependency kit file and the program components thereof from a storage device if the program components for the dependency kit file are not stored in the file directory;

means for storing the program components of the retrieved dependency kit file in the file directory; and means for loading the program components for the retrieved dependency kit files into the runtime environment.

18. The system of claim 15, further comprising;

means for storing in the file directory a previously retrieved copy of the kit file;

means for determining whether the retrieved kit file matches the previously retrieved kit file stored in the file directory;

means for loading the program components from the file directory into the runtime environment if the retrieved and previously retrieved kit files match; and means for throwing an exception if the retrieved and stored kit files do not match.

19. The system of claim 15, further comprising:

retrieving file kits for any nested dependency kit files of the determined dependency kit files;

storing the program components of the nested dependency kit files in the file directory; and loading the program components of the nested dependency kit files in the file directory.

20. The system of claim 14, wherein the kit file comprises an XML document, wherein attributes of the kit file indicate a URL for the program components of the kit file and URLs for the dependency kit files.

21. The system of claim 14, wherein an order in which the kit objects are linked indicates an order in which the program components for the associated kit files are considered to resolve a program call, wherein the program components associated with one kit object at a relatively higher order in the linking of the kit objects are considered before the program components associated with kit objects at a relatively later order in the linking.

22. The system of claim 21, wherein the linking of kit objects comprises a first linking of system kit objects whose associated program components are capable of being shared by all programs executing in the runtime environment and a second linking of kit objects associated with program components that are only used by one program in the runtime environment.

23. The system of claim 22, wherein the second linking comprises multiple chains of kit objects, wherein each chain in the second linking is used by only one program executing in the runtime environment.

24. The system of claim 23, wherein a first and second chains in the second linking are capable of including at least two of a same kit objects in a different order, wherein a first program in the runtime environment associated with the first chain and a second program associated with the second chain resolve program calls from the program components associated with kit objects in the first and second chains, respectively, in the order indicated in the first and second chains.

25. The system of claim 24, wherein the first and second chains include kit objects associated with a first and second version of a same kit file program in a different order, wherein the first and second programs executing in the run time environment would resolve program calls from program components for the version of the kit file according to the order of the corresponding kit objects in the first and second chain, respectively.

26. The system of claim 21, wherein kit objects are linked according to an order in which the dependency kit files are listed in the kit file.

27. A program for use for installing components in a computer runtime environment executing at least one program calling classes and interfaces, wherein the program is implemented in a computer readable medium and capable of causing a computer having memory to perform:

retrieving a kit file including information on program components to load into the memory;

using the retrieved kit file information to retrieve the program components external to the kit file;

loading the retrieved program components for the kit file into the runtime environment; determining whether there are dependency kit files associated with the retrieved kit file;

loading program components for each determined dependency kit file in the runtime environment, wherein the classes and interfaces are resolved using the program components loaded into the runtime environment; and maintaining one kit object for each kit file, wherein one kit object is associated with each kit file and program components of the kit file loaded in the runtime environment, wherein the kit objects are used to determine how to resolve calls from the program components.

28. The program of claim 27, wherein the program code is further capable of causing the computer to perform:

storing the retrieved program components for the retrieved kit file in a file directory; and storing program components for the determined dependency kit files in the file directory.

29. The program of claim 28, wherein the program code is further capable of causing the computer to perform:

retrieving file kits for any nested dependency kit files of the determined dependency kit files;

storing the program components of the nested dependency kit files in the file directory; and loading the program components of the nested dependency kit files in the file directory.

30. The program of claim 28, wherein the program code is further capable of causing the computer to perform:

for each dependency kit file, determining whether the program components for the dependency kit file are stored in the file directory;

retrieving the dependency kit file and the program components thereof from a storage device if the program components for the dependency kit file are not stored in the file directory;

storing the program components of the retrieved dependency kit file in the file directory; and loading the program components for the retrieved dependency kit files into the runtime environment.

31. The program of claim 27, wherein the kit file comprises an XML document, wherein attributes of the kit file indicate a URL for the program components of the kit file and URLs for the dependency kit files.

32. The program of claim 27, wherein order in which the kit objects are linked indicates an order in which the program components for the associated kit files are considered to resolve a program call, wherein the program components associated with one kit object at a relatively higher order in the linking of the kit objects are considered before the program components associated with kit objects at a relatively later order in the linking.

33. The program of claim 32, wherein the inking of kit objects comprises a first linking of system kit objects whose associated program components are capable of being shared by all programs executing in the runtime environment and a second linking of kit objects associated with program components that are only used by one program in the runtime environment.

34. The program of claim 33, wherein the second linking comprises multiple chains of kit objects, wherein each chain in the second linking is used by only one program executing in the runtime environment.

35. The program of claim 34, wherein a first and second chains in the second linking are capable of including at least two of a same kit objects in a different order, wherein a first program in the runtime environment associated with the first chain and a second program associated with the second chain resolve program calls from the program components associated with kit objects in the first and second chains, respectively, in the order indicated in the first and second chains.

36. The program of claim 35, wherein the first and second chains include kit objects associated with a first and second version of a same kit file program in a different order, wherein the first and second programs executing in the run time environment resolve program calls from program components for the version of the kit file according to the order of the corresponding kit objects in the first and second chain, respectively.

37. The program of claim 32, wherein kit objects are linked according to an order in which the dependency kit files are listed in the kit file.

38. A program for use for installing components in a computer runtime environment executing at least one program calling classes and interfaces, wherein the program is implemented in a computer readable medium and capable of causing a computer having memory to perform:

retrieving a kit file including information on program components to load into the memory;

using the retrieved kit file information to retrieve the program components for the kit file;

loading the retrieved program components for the kit file into the runtime environment;

determining whether there are dependency kit files associated with the retrieved kit file;

loading program components for each determined dependency kit file in the runtime environment, wherein the classes and interfaces are resolved using the program components loaded into the runtime environment;

storing the retrieved program components for the retrieved kit file in a file directory; and storing program components for the determined dependency kit files in the file directory, wherein the file directory includes a separate subdirectory for each kit file to store the program components for the kit file, wherein the name of the subdirectory indicates a name and version of the kit file.

39. A program for use for installing components in a computer runtime environment executing at least one program calling classes and interfaces, wherein the program is implemented in a computer readable medium and capable of causing a computer having memory to perform:

retrieving a kit file including information on program components to load into the memory;

using the retrieved kit file information to retrieve the program components for the kit file;

loading the retrieved program components for the kit file into the runtime environment;

determining whether there are dependency kit files associated with the retrieved kit file;

loading program components for each determined dependency kit file in the runtime environment, wherein the classes and interfaces are resolved using the program components loaded into the runtime environment;

storing the retrieved program components for the retrieved kit file in a file directory;

storing program components for the determined dependency kit files in the file directory;

storing in the file directory a previously retrieved copy of the kit file;

determining whether the retrieved kit file matches the previously retrieved kit file stored in the file directory;

loading the program components from the file directory into the runtime environment if the retrieved and previously retrieved kit files match; and throwing an exception if the retrieved and stored kit files do not match.

40. A computer readable medium containing structures used for installing components in a computer runtime environment in a computer memory executing at least one program calling classes and interfaces, wherein the data structures comprise:

a kit file including information on program components to load into the computer memory, wherein the kit file information is retrieved to further retrieve the program components for the kit file, wherein the retrieved program components external to the kit file are loaded into the runtime environment;

at least one dependency kit file associated with the retrieved kit file;

program components for each determined dependency kit file loaded in the runtime environment, wherein the classes and interfaces are resolved using the program components loaded into the runtime environment; and one kit object for each kit file, wherein one kit object is associated with each kit file and program components of the kit file loaded in the runtime environment, and wherein the kit objects are used to determine how to resolve calls from the program components.

41. The computer readable medium of claim 40, further comprising:

a file directory, wherein the retrieved program components for the retrieved kit file and dependency kit files are stored in the file directory.

42. The computer readable medium of claim 41, wherein kits files and related program components for any nested dependency kit files of the determined dependency kit files are stored in the file directory.

43. The computer readable medium of claim 40, wherein the kit file comprises an XML document, wherein attributes of the kit file indicate a URL for the program components of the kit file and URLs for the dependency kit files.

44. The computer readable medium of claim 40, wherein order in which the kit objects are linked indicates an order in which the program components for the associated kit files are considered to resolve a program call, wherein the program components associated with one kit object at a relatively higher order in the linking of the kit objects are considered before the program components associated with kit objects at a relatively later order in the linking.

45. The computer readable medium of claim 44, wherein the liked kit objects comprise a first link of system kit objects whose associated program components are capable of being shared by all programs executing in the runtime environment and a second link of kit objects associated with program components that are only used by one program in the runtime environment.

46. The computer readable medium of claim 45, wherein the second link of kit objects comprises multiple chains of kit objects, wherein each chain in the second linking is used by only one program executing in the runtime environment.

47. The computer readable medium of claim 46, wherein the second link includes a first and second chains that are capable of including at least two of a same kit objects in a different order, wherein a first program in the runtime environment associated with the first chain and a second program associated with the second chain resolve program calls from the program components associated with kit objects in the first and second chains, respectively, in the order indicated in the first and second chains.

48. The computer readable medium of claim 47, wherein the first and second chains include kit objects associated with a first and second version of a same kit file program in a different order, wherein the first and second programs executing in the run time environment would resolve program calls from program components for the version of the kit file according to the order of the corresponding kit objects in the first and second chain, respectively.

49. The computer readable medium of claim 44, wherein the kit objects are linked according to an order in which the dependency kit files are listed in the kit file.

50. A computer readable medium containing data structures used for installing components in a computer runtime environment in a computer memory executing at least one program calling classes and interfaces, wherein the data structures comprise:

a kit file including information on program components to load into the computer memory, wherein the kit file information is retrieved to further retrieve the program components for the kit file, wherein the retrieved program components for the kit file are loaded into the runtime environment;

at least one dependency kit file associated with the retrieved kit file;

program components for each determined dependency kit file loaded in the runtime environment, wherein the classes and interfaces are resolved using the program components loaded into the runtime environment; and a file directory, wherein the retrieved program components for the retrieved kit file and dependency kit files are stored in the file directory, wherein the file directory includes a separate subdirectory for each kit file to store the program components for the kit file, wherein the name of the subdirectory indicates a name and version of the kit file.

\* \* \* \* \*

UNITED STATES PATENT AND TRADEMARK OFFICE
CERTIFICATE OF CORRECTION

PATENT NO. : 6,748,591 B1
APPLICATION NO. : 09/661609
DATED : June 8, 2004
INVENTOR(S) : Stephen Richard Lewallen It is certified that error appears in the above-identified patent and that said Letters Patent is hereby corrected as shown below:

Column 9, line 3, after ";and" begin new paragraph with "storing program".

Column 12, line 42, after "environment;" begin new paragraph with "determining".

Column 14, line 49, after "containing" insert -- data -- .

Column 15, lines 17 and 18, after "40, wherein" insert -- an -- .

Signed and Sealed this

Twenty-seventh Day of November, 2007

JON W. DUDAS
*Director of the United States Patent and Trademark Office*